Figure 1:
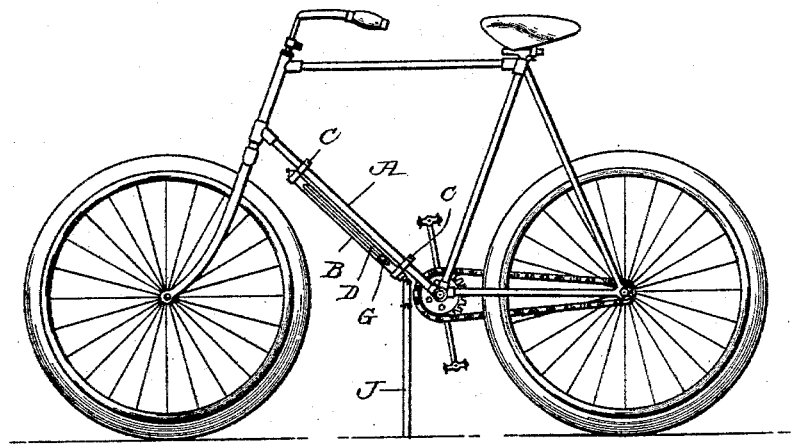

(No Model.)

D. RANCOUR.
BICYCLE SUPPORT.

No. 583,942. Patented June 8, 1897.

Witnesses
Harry L. Amer.
N. S. Hockman.

Inventor,
Dusenbury Rancour.
by John Wedderburn
Attorney

UNITED STATES PATENT OFFICE.

DUSENBURY RANCOUR, OF BROOKLYN, NEW YORK.

BICYCLE-SUPPORT.

SPECIFICATION forming part of Letters Patent No. 583,942, dated June 8, 1897.

Application filed July 25, 1896. Serial No. 600,536. (No model.)

*To all whom it may concern:*

Be it known that I, DUSENBURY RANCOUR, a citizen of the United States, residing at Brooklyn, in the county of Kings and State of New York, have invented certain new and useful Improvements in Bicycle-Supports; and I do hereby declare the following to be a full, clear, and exact description of the invention, such as will enable others skilled in the art to which it appertains to make and use the same.

This invention relates to certain new and useful improvements in bicycle-supports of that class which are attached to the frame of a bicycle and designed to be folded, so as to occupy the least possible space when not in use, but which can be quickly and easily thrown into position for use in holding the bicycle in an upright position when at rest. The device embodies a tube, designed to be clamped or otherwise held to the frame and having therein a sliding bar with legs attached thereto, the bar having a hinged drop and the legs hinged to said drop, so as to extend at an angle thereto, a spring arranged between the legs serving to separate them as they emerge from the tube. The legs when spread form with the rear wheel a sort of tripod, and the sliding bar, with its legs, is designed to be automatic in its action, being held by a thumb-screw, which when loosened allows the bar to slide down within the tube and the legs to be automatically spread as they emerge from the tube. The tube and the other parts may be of aluminium or any other light metal or other material, and the device may be easily attached to or removed from the frame of a bicycle.

Other objects and advantages of the invention will hereinafter appear and the novel features thereof will be specifically defined by the appended claim.

The invention in this instance resides in the peculiar combinations and the construction, arrangement, and adaptation of parts, all as more fully hereinafter described, shown in the drawings, and then particularly pointed out in the claim.

The invention is clearly illustrated in the accompanying drawings, which, with the letters of reference marked thereon, form a part of this specification, and in which—

Figure 2:
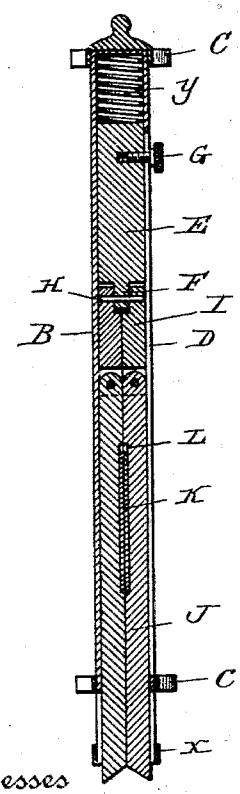
Figure 3:
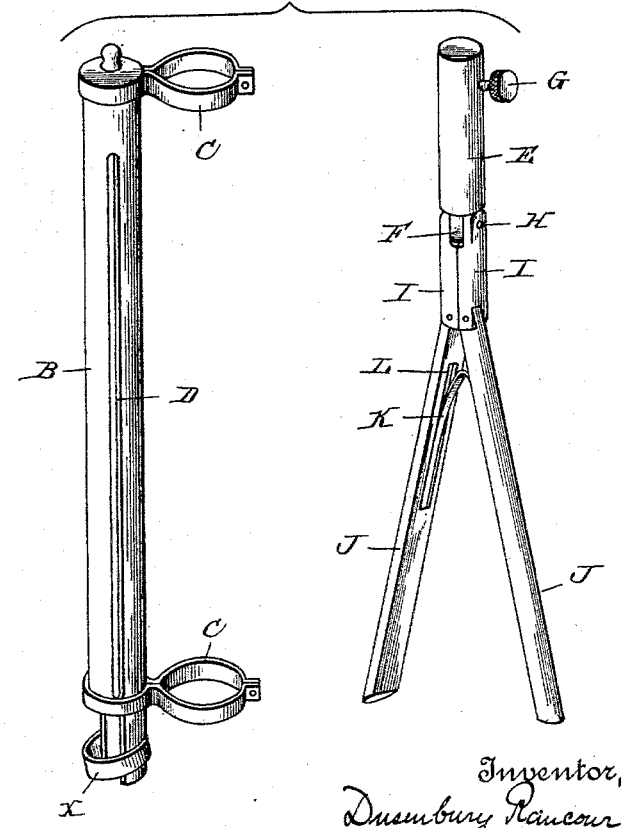

Figure 1 is a view showing the invention applied to the frame of a bicycle. Fig. 2 is a longitudinal section through the tube and the parts inclosed therein. Fig. 3 is an enlarged perspective view of the improvement detached from the bicycle.

Like letters of reference indicate like parts throughout the several views.

Referring now to the details of the drawings by letter, A designates the frame of a bicycle of known construction.

B is a tube of any desired material and diameter and length. It is provided with two or more clamps C, by which it is fastened in position upon the frame of the bicycle parallel with the inclined front bar thereof. This tube has a longitudinal slot D extending for a greater portion of its length, through which works a thumb-screw, hereinafter described.

E is a rod mounted to slide freely within the tube and having a thumb-screw G engaged in a threaded opening therein, as shown, the shank of the screw running or working through the said slot, as shown, and by the tightening of which the rod may be held in its uppermost position. By loosening the screw the rod will be free to slide down within the tube. The lower end of this rod is provided with the central lug F, to which are pivoted on the transverse pivot H, held therein, the arms I, which constitute the drop, the upper ends of the drop-pieces being cut away upon their adjacent faces to provide for the free working thereof on the lug, as shown. It is also provided with a loop X at the lower end of the tube, which, acting on the central lug F, raises the legs to allow them to enter the tube. It acts just below the center, thereby raising the legs and striking them at the side and closing the spring, so as to allow them to readily enter the tube. At the upper inside end of the tube against the cap there is a spring Y, which when the thumb-screw is loosened will start the bar out, thus making it practically automatic in its action.

J are the legs. They are formed of any suitable material and have their upper ends pivotally mounted in the bifurcated lower ends of the drop-pieces. The lower ends of the legs may be beveled or pointed, so that they will afford a better hold on the ground when extended.

K is a spring arranged between the legs and adapted to spread them. This spring may be of any desired form, but in this instance is shown as of a flat piece of spring metal the ends of which are held in recesses L in the adjacent faces of the legs.

The operation will be apparent. When the rider is riding along, the rod is drawn up within the tube and held by tightening the thumb-screw. When the rider desires to stop, he simply loosens the thumb-screw, when the rod will slide down the tube, the legs will spread, and when the drop emerges from the end of the tube the legs will move on their pivots and will stand in an upright position, as shown. The device may be folded within the tube by simply pulling up on the thumb-screw.

The device is light, adds but little to the weight to be carried, is not in the way of the rider, and in practice will be found a most convenient accessory to a bicycle.

What is claimed as new is—

The combination with the tube, of the rod fitted to slide therein, a drop pivoted on the end of the rod, and legs pivoted on the lower end of the drop, substantially as specified.

In testimony whereof I have signed this specification in the presence of two subscribing witnesses.

DUSENBURY RANCOUR.

Witnesses:
FRANCIS HOUGHTALING,
E. T. FORMAN.